Sept. 20, 1932.   F. A. HOPPE   1,878,703
BAKE OVEN
Filed Nov. 20, 1930   2 Sheets-Sheet 2

Inventor:
FRIEDRICH A. HOPPE

Patented Sept. 20, 1932

1,878,703

UNITED STATES PATENT OFFICE

FRIEDRICH A. HOPPE, OF CHICAGO, ILLINOIS, ASSIGNOR TO THE PETERSEN OVEN COMPANY, OF CHICAGO, ILLINOIS, A CORPORATION OF ILLINOIS

BAKE OVEN

Application filed November 20, 1930. Serial No. 496,944.

My invention relates to bakers' ovens, and more particularly to the type known as a "traveler" oven or an oven in which a plurality of trays are carried through the baking chamber by a link conveyor that moves in a circuituous path during the baking operation.

In a traveler oven the conveyor is usually a pair of endless link belts or chains that are driven by and move around sprockets in making the turns in the path or circuit and at the tangents or straight "runs" of the path said links move along straight tracks or guides. These ovens, which are quite long, have their chambers heated in various ways, for example, by steam, hot-air, electricity, gas, etc., and numerous methods are employed for controlling the temperatures in different parts of the chamber. It is desirable in bread baking technique to subject the loaves of dough to a high temperature as soon as the dough is placed in the oven and thereafter to gradually reduce the temperature during a portion of the baking period. After the reduction in temperature it is gradually increased until another peak of high temperature is reached just before the end of the baking. There are a number of methods of modifying the temperature such as control dampers, or the disposition of auxiliary burners at the so-called "hot spots", but these are both expensive and, as they are manually controlled, the judgment of the attendant must be depended upon to operate them at the proper times.

I have designed an oven in which the "hot spots" are provided continuously at the desired locations and which require no more attention from the operator than the other parts of the oven. In order to do this I cause the conveyor or traveler to move over several (two or more) humps so as to carry the loaves to the tops of the chamber where the temperature is highest, and intermediate these humps the conveyor moves upwardly or downwardly through a gradually changing temperature that is relatively cooler than at the tops of the humps or at the "hot spots". This gives the desired increase in temperature at the proper times between the insertion and the removal of the loaves.

Among the objects of my invention are the provision of an oven that is novel and compact in construction, dependable in operation, and which will perform the functions for which it is designed with a minimum of attention from the operator. I prefer to carry out my invention and to accomplish the numerous objects thereof in substantially the manner hereinafter fully described and as more particularly pointed out in the claims, reference being made to the accompanying drawings that form a part of this specification.

In the drawings:—

The drawings will be understood as being more or less schematic for the purpose of illustrating typical or preferred forms in which my invention may be made, and in said drawings similar reference characters have been employed to designate the same parts throughout the views.

Figure 1:
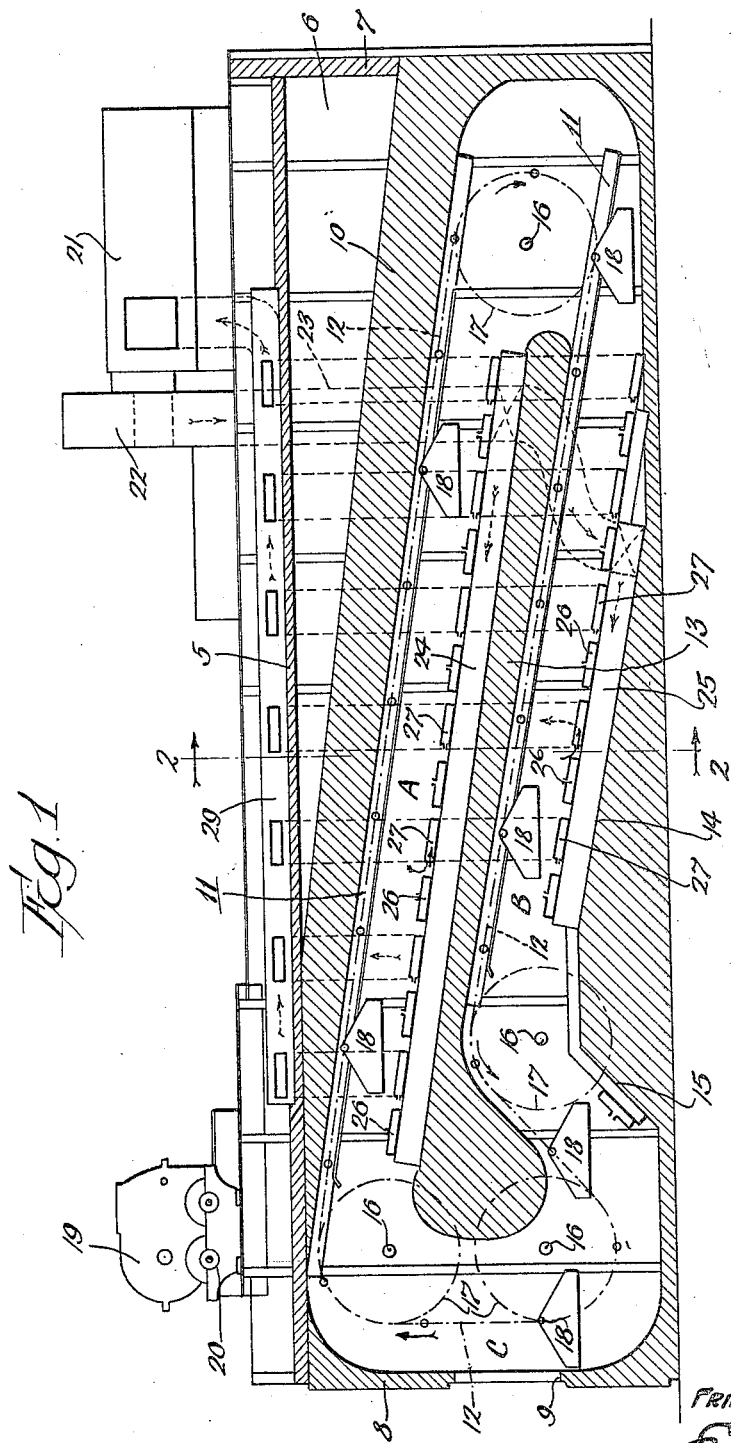
Figure 1 is a vertical longitudinal section of an oven made in accordance with my invention.
Figure 2:
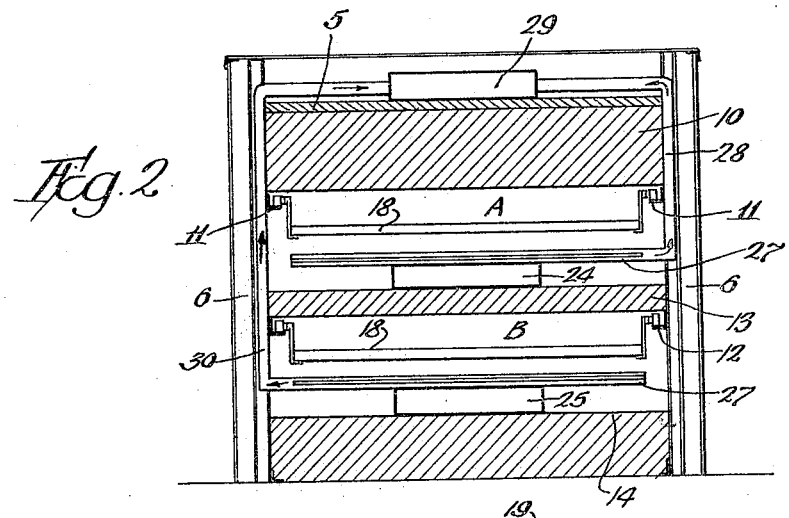
Figure 2 is a vertical transverse section thereof taken on line 2—2 of Figure 1.

Referring more particularly to Figures 1 and 2 it will be seen my invention comprises an elongated structure, preferably rectangular in both cross-section and longitudinal-section. There is a ceiling 5 at the top and there are the usual longitudinal side-walls 6, 6, rear-wall 7 and front-wall 8, the latter being provided with the feed opening 9. Inclining downwardly towards the rear from adjacent the front-wall there is a false ceiling 10 below which is located one of the tangent tracks or guides 11 upon each side wall. These tracks are of angle-metal, as seen in Figure 2 and afford supports for the rollers and chains of the endless conveyor or link belt 12.

Intermediate the false ceiling and the bottom of the oven is an inclined partition or horizontal wall 13 that divides the interior of the structure into upper and lower chambers or runways designated as A and B. The upper surface of the bottom of the structure has an inclined portion 14, that is substantially parallel with the adjacent surface of the partition wall 13 and inclining downwardly towards the rear-wall forward of this portion 14 is a downward and forwardly inclined portion 15. Transverse shafts 16 extend from side-wall to side-wall of the baking chamber formed by the above described structure, one of said shafts being at the rear lower level as seen in Figure 1 and a pair of shafts are disposed in alinement one above the other at the front portion of the chamber adjacent the feed opening 9 so that the trays will travel upwardly past said opening. Adjacent the lower shaft at the front of the oven there is a fourth shaft 16 at about the same horizontal plane as said lower shaft and to the rear thereof. Each of these shafts is provided adjacent its ends with sprockets 17, and the endless conveyor chain is engaged with the sprockets in the manner shown by the dot and dash lines in Figure 1.

The conveyor chain travels in the direction indicated by the arrows through the compartments A and B and upwardly through the vertical front chamber C. The conveyor carries the trays 18 pendently and is moved at a slow speed through the medium of the motor 19 and a gear reduction mechanism 20 mounted upon the top of the oven.

The endless conveyor chain and the hangers with the trays 18 are known in the trade as the "traveler". The circuit traversed by the "traveler", starting at the feed opening 9, is upwardly to the top of the baking chamber, then downwardly towards the rear in a gradually declining direction to the rear sprocket where the "traveler" moves down into the lowest level of the oven, then upwardly substantially parallel with its rearwardly moving "run" to the intermediate sprocket, and passing over the upper portion of this sprocket the traveler moves downwardly and under and then up on the lower front sprocket.

Thus it will be seen that at least twice after the dough is placed upon the trays it reaches the apex of a "hump". Upon reaching the first hump the dough, being in the top of the chamber A, is in the hottest place in the oven chamber and after leaving this first hump it travels downwardly to the rear and after passing around the rear sprocket the dough reaches the lowest level of the oven, having traversed this portion of its path in gradually decreasing temperature. Thereafter the trays moving gradually upwardly in the lower chamber B again reach a "hot-spot" at the second hump in the oven, after which the dough travels downwardly and then upwardly with the finished product to the feed opening where the finished loaves are removed and replaced by fresh loaves of dough.

The oven is heated by means of hot-air which is received from a burner in housing 21 and forced into the oven by blower 22 thus driving the hot-air through the vertical flue 23 into the upper conduit 24 extending longitudinally below the trays of the traveler and are provided with transversely disposed outlet ducts 26 that discharge the hot-air against the bottoms of the trays while the latter are passing over said ducts. The hot-air, filling the chambers A and B, of course will rise to the highest points therein which are the "humps" hereinbefore mentioned. In order to remove the used air there are provided inlet or suction ducts 27 that alternate or are disposed between the outlet ducts 26. These inlet or suction ducts are supported by the conduits 24 and 25 and extend transversely across the chambers A and B in the manner shown in Figure 2, the inlet ducts 27 in the upper chamber A carry the air to the vertical pipes 28 in one side wall and are connected to a main conduit 29 on the top of the oven and the inlet ducts 27 in the lower chamber B carry the hot-air to the vertical pipes 30 in the side-wall opposite pipes 28 and said pipes 30 are also connected with the main conduit 29 that leads to the blast chamber 21 where it is reheated and sent back into the oven chambers by means of the blower 22.

Figure 3:
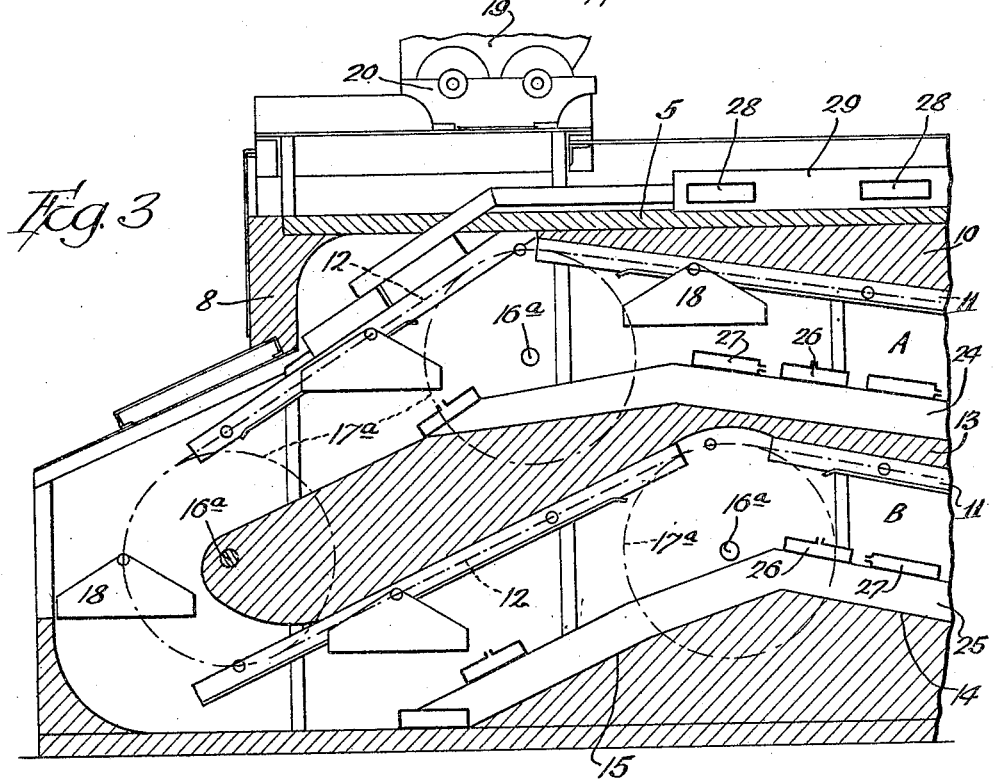
Figure 3 is a vertical longitudinal section of the front portion or feed end portion of a slightly modified form of my invention.

The structure shown in Figure 3 is similar in most respects to that disclosed in Figures 1 and 2 with the exception that the front or forward shafts 16$^a$ and their sprockets 17$^a$ are not in vertical alinement one above the other but the upper sprocket is set backwardly a short distance so that the initial run of the traveler is on an inclined plane toward the rear and upwardly instead of in a vertical plane as shown in Figure 1. Furthermore, on account of the close proximity of the upper sprocket with the sprocket forming the second hump the latter sprocket is positioned slightly farther back than in the structure shown in Figure 1. This arrangement permits the loading opening to be made in both a horizontal and inclined portion of the front and does not materially alter the operation of the oven.

What I claim is:—

1. A traveler oven comprising a housing consisting of vertical front, rear and side walls and a top wall inclined downwardly from the front to the rear wall, a bottom inclined substantially parallel to said top wall, a transverse partition between said top wall and bottom dividing the space there-between into superposed inclined compartments that are higher at their forward ends than at their rear ends, downwardly and forwardly inclined extensions at the front portions of said bottom and partition providing an inclined continuation leading downwardly from the high portion of the lower compartment, said partition extension terminating back of the front wall to provide an upwardly extending passage connecting the forward portion of the continuation of the lower compartment with the forward high end of the upper compartment, devices for conveying articles to be baked through said compartments, said continuation and said passage, and means for supplying heat to the interior of said housing.

2. A traveler oven comprising a housing consisting of vertical front, rear and side walls and an inclined ceiling sloping down from the upper portion of the front wall toward the rear, an inclined floor sloping in the same direction as said ceiling, an inclined transverse partition dividing the space between said ceiling and floor into superposed inclined compartments the disposition of said partition being such that said compartments communicate with each other at their lower rear ends, downwardly and forwardly inclined extensions at the front portions of said partition and said bottom providing a downwardly inclined passage from the higher front portion of said lower compartment, an upwardly extending passage formed back of the housing front wall connecting the first-mentioned passage to the upper compartment, devices for conveying articles to be baked through said compartments and passages, and means for supplying heat to certain of said compartments and passages.

3. A traveler oven comprising a housing consisting of vertical front, rear and side walls and an inclined top wall sloping down from the upper portion of the front wall to said rear wall, an inclined bottom sloping in the same direction as said top wall, an inclined transverse partition dividing the space between said top wall and bottom into superposed inclined compartments the disposition of said partition being such that said compartments communicate with each other at their lower rear ends, downwardly and forwardly inclined extensions at the front portions of said partition and said bottom providing a downwardly inclined passage from the higher front portion of said lower compartment, an upwardly extending passage formed back of the housing front wall connecting the first-mentioned passage to the upper compartment, devices for conveying articles to be baked successively through said upwardly extending passage, said upper and said lower compartment, and said downwardly inclined passage, and means for supplying heat to certain of said compartments and passages.

4. A bake oven comprising top, rear and side walls, a front wall provided with a horizontal doorway, said walls combined to provide a housing, front and rear ceilings forming the top of a lower compartment, the front ceiling inclined up from near the door opening, the rear ceiling inclined down from the high portion of the front ceiling towards the rear, a barrier formed in the floor of the lower compartment adjacent the high ceiling portion, the top of said barrier being adjacent and below the high ceiling portion and in a plane above the horizontal plane of the bottom of the door opening, and a second compartment formed above said lower compartment and communicating therewith at its ends.

5. A bake oven comprising a housing consisting of top, front, rear and side walls, said front wall having a horizontal doorway, a transverse partition between said top wall and the bottom of the housing dividing the interior thereof into superposed compartments, the ends of said partition being spaced from the front and rear walls to provide passages connecting forward and rear portions of upper and lower compartments, the under surface of said partition which provides the ceiling of the lower compartment having front and rear slanting portions that incline upwards toward each other to a juncture in the front portion of the housing, and barrier means rising from the floor of the lower compartment to a horizontal plane above the lower edge of the doorway.

6. A bake oven comprising top, rear and side walls, a front wall provided with a horizontal doorway, said walls combined to proivde a housing, a lower compartment formed with front and rear ceiling portions, the front ceiling portion being relatively shorter than the other ceiling portion and inclined up from near the doorway at an abrupt angle to a high level in the forward portion of the compartment, the rear ceiling portion sloping downwardly from the high level toward the rear, a barrer extending upwardly from the floor of the lower compartment adjacent the juncture of the ceiling portions and extending to a horizontal plane above the plane of the lower edge of the doorway, and a second compartment formed in a housing above the lower compartment and having communication therewith at its ends.

Signed at Chicago, in the county of Cook, and State of Illinois, this 9th day of October, 1930.

FRIEDRICH A. HOPPE.